(12) United States Patent
Renda

(10) Patent No.: US 7,602,145 B2
(45) Date of Patent: Oct. 13, 2009

(54) METHOD OF BALANCING BATTERIES

(75) Inventor: Gregory Lee Renda, Saratoga, CA (US)

(73) Assignee: Tesla Motors, Inc., San Carlos, CA (US)

( * ) Notice: Subject to any disclaimer, the term of this patent is extended or adjusted under 35 U.S.C. 154(b) by 220 days.

(21) Appl. No.: 11/488,353

(22) Filed: Jul. 18, 2006

(65) Prior Publication Data

US 2008/0018299 A1    Jan. 24, 2008

(51) Int. Cl.
*H02J 7/00* (2006.01)
(52) U.S. Cl. .................. 320/119; 320/116; 320/118
(58) Field of Classification Search .......... 320/116–127
See application file for complete search history.

(56) References Cited

U.S. PATENT DOCUMENTS

| | | | | |
|---|---|---|---|---|
| 5,644,209 A | * | 7/1997 | Chabbert et al. ............ | 320/122 |
| 5,666,040 A | * | 9/1997 | Bourbeau .................... | 320/118 |
| 6,114,835 A | * | 9/2000 | Price .......................... | 320/118 |
| 6,417,648 B2 | * | 7/2002 | Suzuki et al. ............... | 320/136 |
| 6,873,134 B2 | * | 3/2005 | Canter et al. ................ | 320/118 |
| 2001/0035737 A1 | * | 11/2001 | Nakanishi et al. .......... | 320/122 |

\* cited by examiner

*Primary Examiner*—Edward Tso
*Assistant Examiner*—Samuel Berhanu
(74) *Attorney, Agent, or Firm*—Raggio & Dinnin, P.C.

(57) ABSTRACT

A methodology for balancing batteries for use in an electric vehicle. The methodology includes initializing a target balance voltage value to a predetermined voltage. Sampling a first voltage of the batteries at a predetermined interval. Sending the lowest voltage value to all of the batteries. Replacing the target value voltage with the lowest voltage if the lowest voltage is lower than the target balance voltage and bleeding the batteries if a sampled voltage is higher than the target balance voltage.

18 Claims, 4 Drawing Sheets

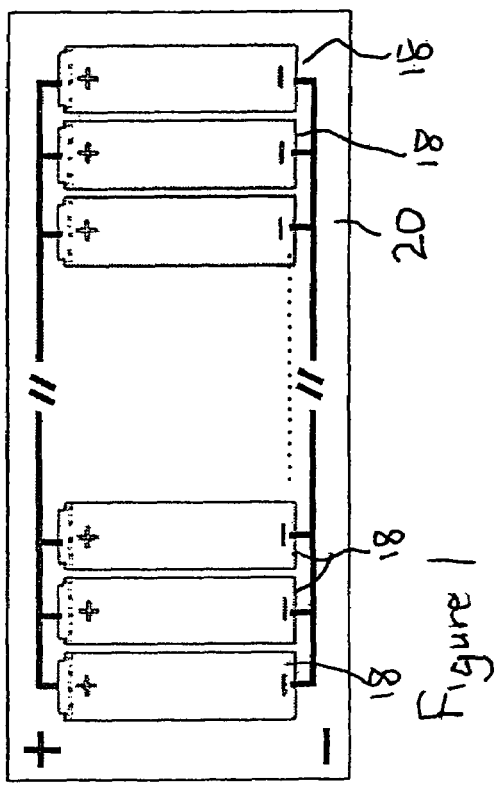
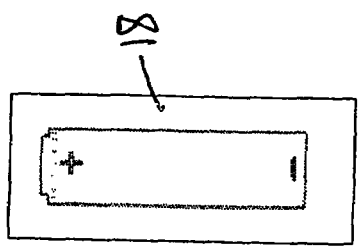
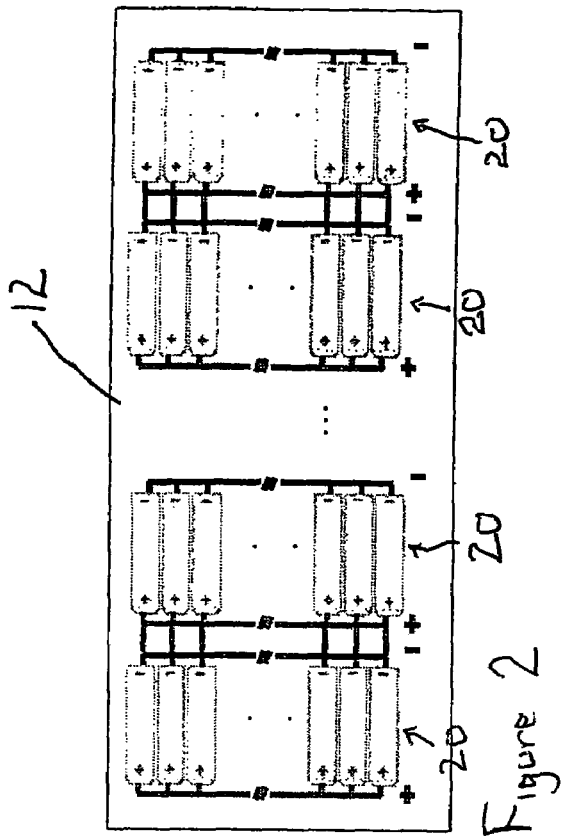
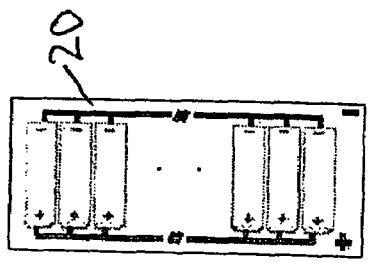
Figure 1
Figure 2

METHOD OF BALANCING BATTERIES

BACKGROUND OF THE INVENTION

1. Field of the Invention

The subject invention generally relates to balancing batteries and more particularly relates to a method of balancing batteries for use in an electric vehicle.

2. Description of Related Art

It is well known in the prior art to use all electric automobiles to provide transportation for occupants. Many of these prior art electric automobiles carry several thousand pounds of nickel metal hydride batteries to achieve a long range electric vehicle for every day use by consumers. Furthermore, many of these prior art electrical cars needed to be physically large and heavy to accommodate all of these batteries, such that these cars were not capable of achieving necessary acceleration, handling, performance, and the extended range needed for an electric car to become a feasible option for public purchase and use. Many prior art electric cars that were normal size and not overly heavy would have a very small range, thus reducing the feasibility for large mass selling of such cars to the consuming public. Furthermore, many of these prior art electric cars which used such large batteries had problems with protecting the occupants of the vehicle from the high voltage components necessary to move the car at acceptable speeds comparable to that of a gasoline or diesel internal combustion engine. Furthermore, many of these prior art electrical cars had problems with the prior art batteries staying properly charged and having a generally equal balance of charge available between batteries stored within the electric vehicle.

Generally, the batteries arranged within many prior art electric vehicles attempt to have approximately the same voltage. Thus, balancing of the voltages of all of these batteries was performed at predetermined intervals in many prior art electric cars. Some of these prior art balancing systems used external microprocessor equipment to query the voltages of each battery. Then the processor would send commands to adjust all of the batteries such that all of the batteries had generally the same voltage. However, disadvantages occurred with this prior art system such as the external microprocessor might not be connected to the batteries, hence balancing would not be started or stopped at an appropriate time without instructions from the external microprocessor. This generally might occur after the batteries have been assembled but before installed into the motor vehicle and connected to the external microprocessor controlling the overall vehicle electrical system.

Therefore, there is a need in the art for an improved methodology of self balancing batteries in an electric vehicle. There also is a need in the art for a methodology that will have enable and disable commands available for use by an external microprocessor. There also is a need in the art to have a methodology that will prevent balancing from being permanently disabled, hence only having balancing disabled for a specified time period. Furthermore, there is a need in the art for a self balancing methodology for batteries in an electric vehicle that allows balancing to begin the moment the batteries are connected or disconnected from each other and between other batteries arranged at other portions of the vehicle.

SUMMARY OF THE INVENTION

One object of the present invention is to provide an improved methodology for balancing batteries.

Another object of the present invention may be to provide a methodology for self balancing batteries for use in an electric vehicle.

Still another object of the present invention may be to provide a methodology that will bleed or charge batteries to a predetermined level but never outside a fixed minimum or maximum voltage value.

Still another object of the present invention may be to provide a self balancing methodology for balancing batteries that occurs from the moment a battery is attached to a sheet or sheets are connected or disconnected from each other.

Still another object of the present invention may be to provide a way of balancing a voltage across numerous modules of batteries or a single module of batteries.

Still another object of the present invention may be to provide a way of communication between sheets of batteries within an electric vehicle for self balancing between all sheets of batteries.

To achieve the foregoing objects a method of balancing batteries for use in a vehicle is disclosed. The method includes the step of initializing each of the battery modules with a target balance voltage derived from the voltages of the batteries attached to the module. The method then announces the target balance voltage derived from the voltages of the batteries attached to the module to the other battery modules. Upon reception of an announcement from another battery module, the method will compare the announced target balance voltage with the module's current target balance voltage and replace the module's current target balance voltage with the announced target balance voltage if appropriate. Then the method will adjust the voltages of the module's batteries based upon the module's current target balance voltage.

One advantage of the present invention may be that it provides a novel and improved methodology for self balancing batteries.

Still a further advantage of the present invention may be that it provides a methodology of self balancing batteries for use in an electric vehicle.

Still another advantage of the present invention may be that it provides a way of balancing the batteries of an electric vehicle without connecting to an external microprocessor for commands to perform such balancing.

Still another advantage of the present invention is that it may provide a methodology of self balancing batteries for an electric vehicle such that the batteries will never be adjusted outside of a safe voltage range.

Still another advantage of the present invention may be that it provides a methodology that uses enabling or disabling commands by an external microprocessor to prevent invalid voltage measurements while batteries are either being charged or discharged at high current.

Still another advantage of the present invention may be that it provides a self balancing methodology that is capable of operation upon connection of batteries to the system or connection of batteries in series with other batteries within the system.

Other objects, features and advantages of the present invention will become apparent from the subsequent description and the appended claims, taken in conjunction with the accompanying drawings.

BRIEF DESCRIPTION OF THE DRAWINGS

FIG. 1 shows battery cells connected in parallel to form a brick according to the present invention.

FIG. 2 shows bricks of battery cells connected in series to form a sheet according to the present invention.

DESCRIPTION OF THE EMBODIMENT(S)

Figure 3:
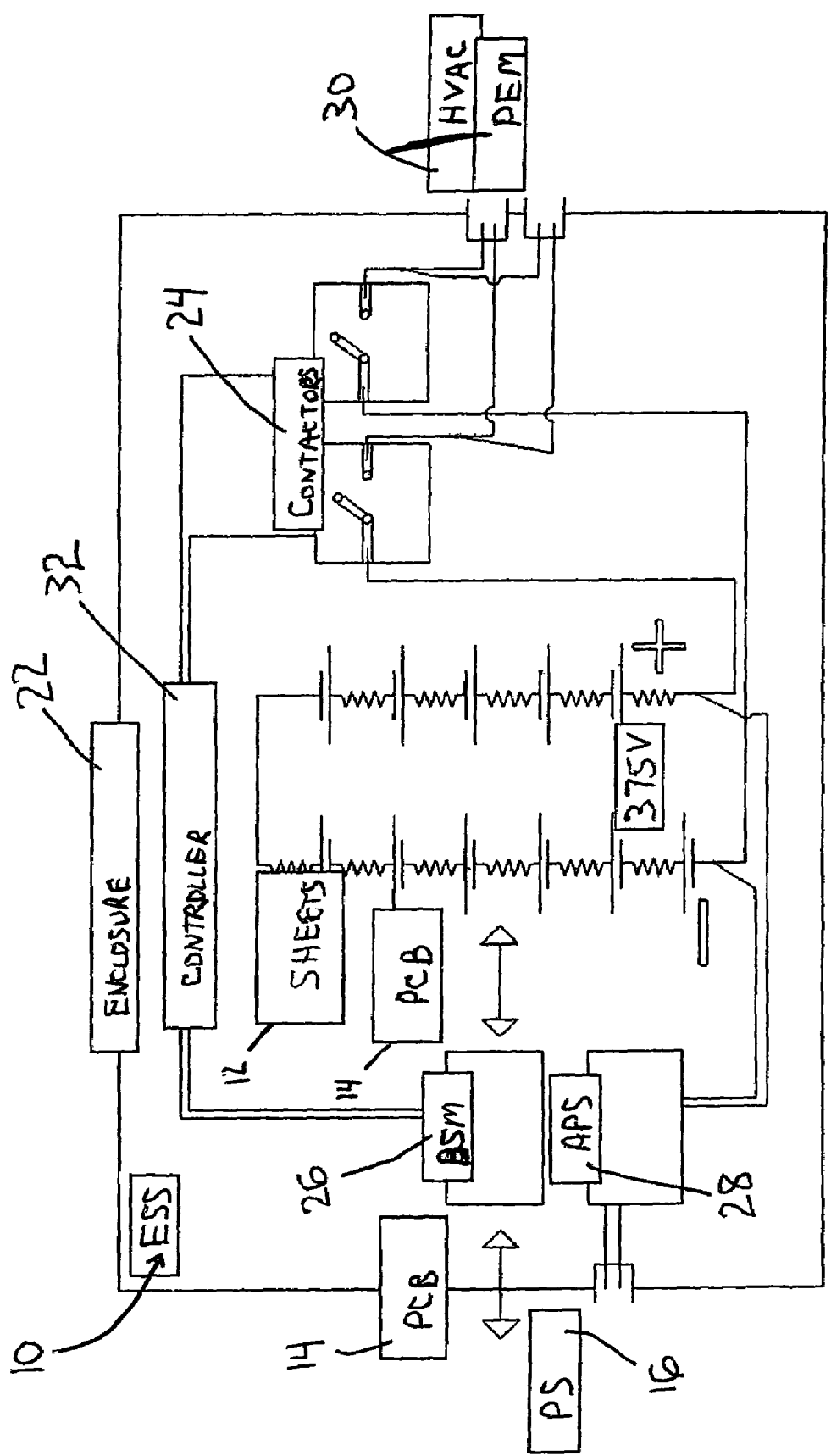
FIG. 3 shows an architectural representation of an energy storage system (ESS) according to the present invention.
Figure 4:
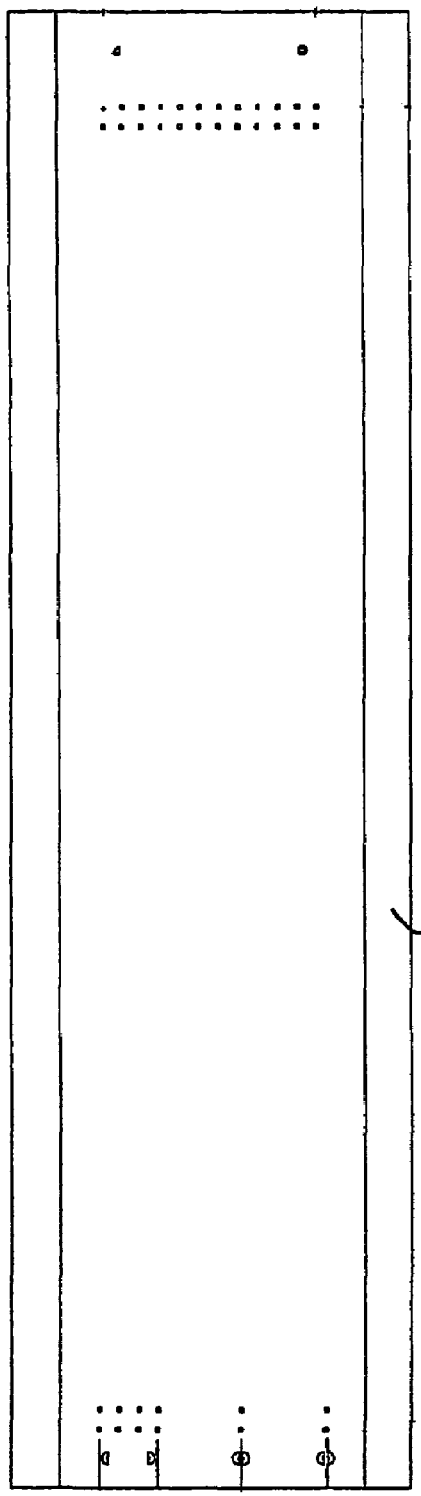
FIG. 4 shows a top view of a battery monitoring board (BMB) according to the present invention.
Figure 5:
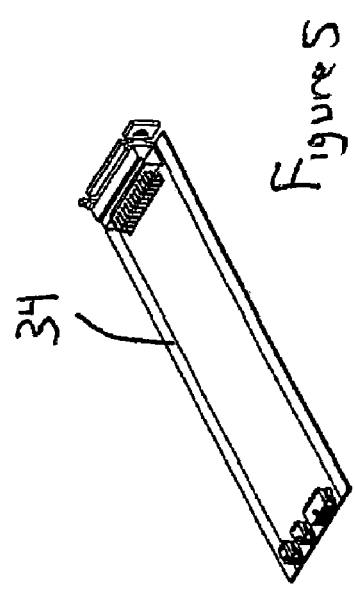
FIG. 5 shows a perspective view of a battery monitoring board (BMB) according to the present invention.

Referring to the drawings, an energy storage system 10 and methodology for balancing batteries within the energy storage system 10 is shown. The energy storage system (ESS) or battery pack 10 is generally comprised of a predetermined number of battery modules or sheets 12, a main control and logic PCB 14, and a 12 volt power supply 16. In one embodiment contemplated the energy storage system 10 will have eleven battery modules or sheets 12 which is capable of producing approximately 375 volts DC. This nominal voltage will operate an electric vehicle that will be capable of traveling many miles without recharging and is capable of delivering enough power and acceleration to compare favorably with internal combustion engines. In one contemplated embodiment the battery pack 10 will be capable of storing enough energy such that the electric vehicle can travel approximately 200 miles without recharging. However, it should be noted that it is also contemplated to have an electric vehicle based on the present invention that can travel well over 200 miles without recharging. It is also contemplated in one embodiment that the electric vehicle using the battery pack 10 of the present invention will be capable of accelerating from zero to 60 miles per hour in approximately four seconds. No other electric car known has produced this type of acceleration and mileage range without recharging.

The present invention uses batteries 18 made of lithium ion cells. In particular, one embodiment uses commodity 18,650 form factor lithium ion cells for the electric vehicle. The batteries 18 in the present invention store the chemical energy equivalent of approximately two gallons of gasoline. The battery pack 10 operates at a nominal 375 volts and delivers approximately up to 240 horsepower to the motor. The energy and power capabilities of the battery pack 10 allow for the battery pack 10 design and architecture to have many features that ensure the safety of the vehicle and its occupants during the use of the electric vehicle. It should be noted that the lithium ion cells 18 are rechargeable such that after recharging, the batteries 18 will be able to provide traction power for the vehicle based upon a fully recharged and capable battery. The battery pack or energy storage system 10 in one embodiment comprises 6,831 individual lithium ion 18,650 cells that will allow for it to achieve the drive power and range necessary for the vehicle. These cells 18 are electrically connected in parallel groups of 69 cells wherein each of these groups of 69 cells constitutes an electric module called a brick 20.

The bricks 20 are then connected in series within individual battery modules 12 in the energy storage system 10 called sheets 12. Each sheet or battery module 12 is a single mechanical assembly and consists of nine bricks 20 electrically connected in series. It should be noted that it is contemplated that the sheets or battery modules 12 will be the smallest replaceable unit within the battery pack 10. Each sheet or battery module 12 generally has a nominal voltage of approximately 35 volts DC. Furthermore, each of these sheets 12 contains a mechanical mounting system, battery monitoring hardware electronics, a cooling system, as well as various safety systems to ensure proper protection for the vehicle and occupants of such vehicle. In the embodiment contemplated eleven sheets 12 will be used in total to bring approximately 375 nominal volts DC to the ESS 10 for use in the electric car. Each of these sheets are rigidly mounted in an ESS enclosure 22 and electrically connected to one another in series. This series connection will create the nominal voltage of approximately 375 volts DC as described above. It should be noted that the ESS 10 contemplated and shown in the present invention has a nominal voltage of approximately 375 volts, however that voltage can be adjusted by either increasing or decreasing the number of sheets and/or boards within the ESS or battery pack 10. Furthermore, each sheet 12 will also contain a fuse that is electrically in series. The ESS 10 will also generally include two normally open contactors 24 that are controlled by a watchdog computer, i.e., BSM or battery safety monitor 26, that is also capable of shutting off high voltage to the rest of the vehicle in the case of a fault within the battery pack 10. The ESS 10 also includes an auxiliary power system or APS 28, a DC to DC converter, which provides 12 volt power to the rest of the vehicle. It should be noted that the entire system is contained inside an enclosure 22 which prevents access to any high voltage leads from occupants or users of the vehicle. In one embodiment contemplated the enclosure 22 is made of an aluminum material, however any other non conductive material may be used depending on the design requirements of the vehicle. The system 10 also includes a plurality of other components such as electrical hardware to monitor the battery 32, a plurality of sensors to monitor the environment, a cooling system 30 and other safety features intended to create a safe environment for the occupants and users of the electric vehicle. It should be noted that when the contactors 24 within the ESS enclosure 22 are not energized by the battery safety monitor 26 and are in their normal or open state, there is no external high voltage access available outside of the ESS enclosure 22 in the electric vehicle.

The ESS 10 includes battery monitoring boards (BMB) 34. A battery monitoring board 34 is associated with each sheet 12 of the battery pack 10. The battery monitoring board 34 monitors the voltage levels and other parameters of all of the bricks 20 within its sheet 12. As described above, nine bricks 20 are electrically connected in series within each sheet 12. However, it should be noted that any other number of bricks 20 or sheets 12 may be used for the ESS or battery pack 10 of the present invention. The battery monitoring board 34 also is capable of connecting a small load to an individual brick 20 within its sheet 12 to bleed the brick voltage of that specific brick 20 to a lower level. It should further be noted that the battery monitoring boards 34 are networked to each other using a controller area network (CAN) bus. In an effort to more efficiently use the power provided by the ESS or battery pack 10 it is desirable to have all of the voltage levels of all of the bricks 20 within the battery pack 10 at the same voltage level. In the embodiment contemplated it is desirable to have each of the voltage levels of all bricks 20 within the battery pack 10 within a predetermined voltage delta ($\Delta V$). In one embodiment contemplated the voltage delta is approximately 20 millivolts. However, the voltage delta may be within the range of one millivolt up to many volts depending on the design requirements for the battery pack 10 and the electric vehicle. There is a desirability to have the voltage levels of all bricks 20 match as closely as possible to one another to increase efficiency of the batteries and range of the electric vehicle, this is generally accomplished by balancing of the batteries.

The present invention includes a self balancing methodology or algorithm 40 for use in the battery pack or ESS 10 of the present invention. It should be noted that the methodology 40 can be used on any battery or battery system or pack not just those in vehicles. A general flowchart is shown in FIG. 6 for such a self balancing methodology 40.

The present invention includes two contemplated mechanisms for adjusting a brick 20 voltage. One is to decrease the brick 20 voltage by discharging the brick 20 by connecting a small load to the brick 20 (discharge mechanism). The other is to increase the brick 20 voltage and charge the brick 20 by connecting a source of power to the brick 20 (charge mechanism). Either mechanism may be used with the described methodology.

Figure 6:
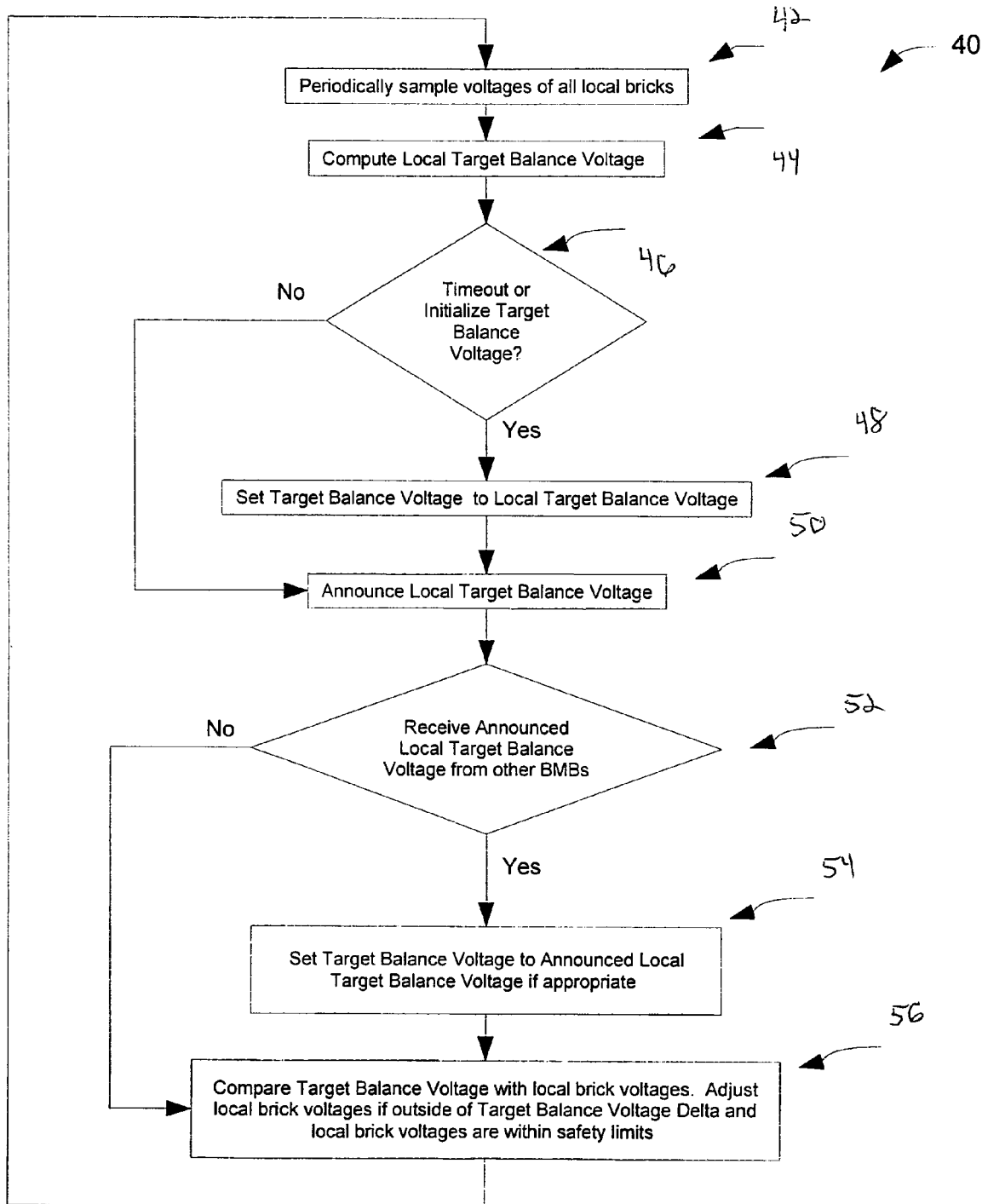
FIG. 6 shows a flow chart of a methodology of balancing batteries according to the present invention.

As shown in FIG. 6, the methodology starts in box 42 where each of the battery monitoring boards 34 will periodically sample the voltage level of all its bricks 20 at a predetermined interval. Then, in box 44, the battery monitoring board 34 will determine the local target balance voltage (LTBV). When using the discharge mechanism, the LTBV will be the lowest voltage of the sampled bricks 20. When using the charge mechanism, the LTBV will be the highest voltage of the sampled bricks 20. The target balance voltage (TBV) is then initialized from the LTBV in box 48. The methodology then, in box 50 will send the LTBV via the CAN bus to all other battery monitoring boards 34. This announcement of the LTBV by one of the battery monitoring boards 34, via the CAN bus, will allow all of the other battery monitoring boards 34, in this example the other ten, to receive such announcement of the LTBV from the announcing battery monitoring board 34. In box 52 upon receiving an Announced LTBV (ALTBV) from another battery monitoring board 34 the methodology will compare the ALTBV with the TBV. If the charge mechanism is used and the ALTBV is greater than or equal to the TBV, then the TBV will be set to the ALTBV. If the discharge mechanism is used and the ALTBV is less than or equal to the TBV, then the TBV will be set to the ALTBV. If no ALTBV is received from another battery monitoring board 34, the TBV will remain unchanged from its initialized value. The methodology will next compare the sampled voltage levels against the TBV in box 56. If the sampled voltage level of a brick 20 is outside of the previous described voltage delta and the brick 20 is within a voltage safety limit range, the battery monitoring board 34 will then either charge or discharge that brick 20, depending upon the mechanism being used. After comparing all the brick 20 voltage levels against the TBV, the battery monitoring board 34 returns to periodically sampling the voltage level of all its bricks 20 at a predetermined interval.

It should also be noted that safeguards are built into the methodology 40 to ensure proper use of the balancing algorithm within the ESS 10. One of the safeguards will prevent a brick 20 from being overdischarged or overcharged. To protect against overdischarge or overcharge, the methodology does not allow a brick 20 to be charged or discharged if a brick 20 voltage level is outside of a fixed voltage range.

Furthermore, another safeguard that the methodology uses will allow it to monitor and recover from an anomalous ALTBV or an ALTBV from a battery monitoring board 34 that is no longer in the ESS and/or connected to the CAN bus. To prevent such occurrences each of the battery monitoring boards 34 will periodically timeout and replace its TBV with its LTBV. This periodic replacement will occur when the TBV has not been updated by an ALTBV for a predetermined interval. In one contemplated embodiment this time interval will be approximately 240 seconds. However, any other time interval may be used depending on the design requirements of the ESS 10. It should be noted that the time intervals should be greater than the voltage announcement interval. In one contemplated embodiment the battery monitoring board 34 announces its LTBV approximately every 120 seconds. However, it should be noted that any other time interval can be used depending on the design requirements for the ESS 10. It should further be noted that in order to prevent all of the battery monitoring boards 34 from announcing their LTBVs simultaneously the first announcement after booting of the system 10 is delayed by a predetermined amount of time based upon the battery monitoring boards 34 unique CAN identification or ID.

It should further be noted that voltage measurements may not be valid while the ESS 10 is being charged or discharged at high current during operation of the vehicle. As such balancing of the bricks 20 and batteries may be disabled by use of commands from an external microprocessor during such charging and discharging operations. If the voltage measurements are not valid the balancing becomes ineffective and at such time the external microprocessor will disable the balancing algorithm from operating. After the charging or discharging at high current is complete the external microprocessor will enable the balancing algorithm and methodology to continue. However, the system also will prevent the balancing methodology and algorithm from being permanently disabled by having the balancing algorithm only disabled for a specified time period that can be anywhere from a few milliseconds to many minutes depending on the charging or discharging at high currents occurring in the ESS 10.

It should further be noted that the self balancing methodology of the battery pack or ESS 10 will allow for balancing of the batteries to begin from the moment a battery monitoring board 34 is attached to a sheet 12. Furthermore, if sheets 12 are connected or disconnected from each other balancing will automatically occur between the sheets 12 via announcement of the LTBV via the CAN bus within the vehicle electrical architecture.

It should be noted that the mechanism that raises the voltage of the lowest brick up to the level of the highest brick is contemplated to be implemented by only using energy from other bricks in the sheet 12 or battery pack 10 and/or may be from other residual energy collected during operation of the vehicle. It should be noted that the mechanism of raising the voltage of the lowest brick up to the level of the highest brick may lead to a more efficient methodology and ESS 10. This efficiency will be achieved through the use of energy being shifted and moved between bricks 20 and not bled as in the discharge mechanism. Therefore, the redistribution of the energy among the bricks 20 will lead to a more efficient system and increased range of the vehicle. It should be noted that the sampling of voltages occur at intervals that will allow for a constant movement of the target balance voltage for the highest brick voltage of the battery pack 10 and/or sheet 12 to be constantly adjusted in either an upward or downward direction depending on the energy shift between battery bricks 20 during operation of the alternate methodology. Thus, if the lowest brick voltage is charged to the currently stored highest target balance voltage, such charging of the lowest brick voltage will shift energy from other bricks 20 within the sheet 12 or battery pack 10 thus generally lowering the highest target balance voltage a predetermined amount. The constantly changing highest target balance voltage will in effect shift the charge throughout the battery pack 10 such that the batteries remain in balance thus increasing efficiency and range of the electric vehicle. It should be noted that this methodology may be used in any known vehicle and in any known system such as but not limited any system that uses batteries or any other known electrical system and is not limited to use in vehicles. Therefore, either the highest target balance voltage or lowest target balance voltage mechanisms as described herein may be used for any known system that uses batteries or battery packs to provide power to such system or the like.

The present invention has been described in an illustrative manner. It is to be understood that the terminology which has been used is in intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of balancing voltage between batteries, said method including the steps of:
    sampling a first voltage of one of the batteries at a predetermined interval;
    initializing a target balance voltage value to a predetermined voltage for each battery;
    sending said first voltage value to all other batteries;
    replacing said target balance voltage with said first voltage if said first voltage is lower than said target balance voltage;
    bleeding said battery if a sampled voltage is higher than said target balance voltage; and
    replacing said target balance voltage if a predetermined time interval passes.

2. The method of claim 1 further including the step of determining if said sampled voltage is outside of a voltage delta.

3. The method of claim 2 wherein said voltage delta is approximately 20 millivolts.

4. The method of claim 1 further including the step of determining if battery is bled below a predetermined value.

5. A method of balancing batteries for use in a vehicle having a predetermined number of batteries being arranged in a brick, a predetermined number of bricks being arranged within a battery module and the vehicle having a predetermined number of battery modules therein, each battery module having a battery monitoring board, said method including the steps of:
    sampling a first voltage for each brick at a predetermined time;
    initializing each of the battery modules with a target balance voltage;
    determining the lowest voltage for each battery module;
    replacing said target balance voltage if said lowest voltage is lower than said target balance voltage;
    bleeding one of the bricks if said first voltage is greater than said target balance voltage; and
    periodically replacing said target balance voltage with the lowest voltage of all of the bricks within a specific battery module if a predetermined time interval passes.

6. The method of claim 5 wherein said step of initializing sets said target balance voltage with a lowest brick voltage for all bricks in said battery module.

7. The method of claim 5 further including the step of sending said lowest voltage for each battery module to all other batter modules.

8. The method of claim 7 further including the step of comparing said sent lowest voltage with said target balance voltage.

9. The method of claim 5 further including the step of comparing said target balance voltage to said voltage of each brick.

10. The method of claim 5 further including the step of determining if said voltage of each brick is outside of a predetermined voltage delta.

11. The method of claim 5 further including the step of determining if said voltage of each brick is less than a fixed minimum voltage level.

12. The method of claim 10 wherein said voltage delta is twenty millivolts.

13. The method of claim 7 wherein said step of sending occurs at an approximate 120 second interval.

14. The method of claim 6 wherein said step of periodically replacing said target balance voltage occurs at an approximate 240 second interval.

15. A method of balancing batteries for use in an electric vehicle, the module having a predetermined number of the batteries being arranged in a brick, a predetermined number of bricks being arranged within a battery module or sheet, the electric vehicle also having a predetermined number of battery modules or sheets, each battery module having an associated battery monitoring board which is in communication with every other battery monitoring board, said method including the steps of:
    sampling a voltage for each brick at a predetermined time interval;
    initializing a target balance voltage value in each battery monitoring board with an initial lowest brick voltage for the battery module controlled by each battery monitoring board;
    sending an announced lowest brick voltage for each battery module to every other battery monitoring board;
    comparing in each battery monitoring board said announced lowest brick voltage and said target balance voltage;
    replacing said target balance voltage with said announced lowest brick voltage if said announced lowest brick voltage is less than said target balance voltage; and
    bleeding any brick if said sampled voltage is greater than said target balance voltage and is outside of a predetermined voltage delta.

16. The method of claim 15 further including the step of determining if said sampled voltage or said target balance voltage is less than a fixed minimum voltage value.

17. The method of claim 15 further including the step of periodically replacing said target balance voltage with a lowest voltage of the bricks of each battery module if a predetermined time interval passes and at least one of said announced lowest brick voltage being less than or equal to said target balance voltage has not been received.

18. The method of claim 15 further including the step of bleeding said brick to said target balance voltage by inducing a predetermined sized load on said brick.

* * * * *